(12) United States Patent
Yamamoto et al.

(10) Patent No.: US 11,797,914 B2
(45) Date of Patent: Oct. 24, 2023

(54) DELIVERY MANAGEMENT SYSTEM AND DELIVERY MANAGEMENT METHOD

(71) Applicant: TOYOTA JIDOSHA KABUSHIKI KAISHA, Toyota (JP)

(72) Inventors: Takashi Yamamoto, Toyota (JP); Kunihiro Iwamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 192 days.

(21) Appl. No.: 17/487,163

(22) Filed: Sep. 28, 2021

(65) Prior Publication Data

US 2022/0108267 A1    Apr. 7, 2022

(30) Foreign Application Priority Data

Oct. 2, 2020  (JP) ................................. 2020-168115

(51) Int. Cl.
  *G06Q 10/08* (2023.01)
  *G06Q 10/0834* (2023.01)
  *A47G 29/14* (2006.01)

(52) U.S. Cl.
  CPC ....... *G06Q 10/0834* (2013.01); *A47G 29/141* (2013.01)

(58) Field of Classification Search
  CPC ...... A47G 29/141; A47G 29/20; A47G 29/28; A47G 2029/142; A47G 2029/143; A47G 2029/145; A47G 2029/147; A47G 2029/149; G06Q 10/0834; G06Q 10/087; G06Q 10/0836; G06Q 10/083; G06Q 30/06; G06Q 50/28; E06B 7/32; E05G 7/00; G06K 17/0029
  See application file for complete search history.

(56) References Cited

U.S. PATENT DOCUMENTS

| | | | |
|---|---|---|---|
| 5,774,053 A * | 6/1998 | Porter | F25D 23/10 340/568.1 |
| 6,079,216 A * | 6/2000 | de Marsillac Plunkett | A47G 29/20 312/286 |
| 6,204,763 B1 | 3/2001 | Sone | |
| 6,415,552 B1 * | 7/2002 | Khosropour | F25D 23/12 52/27 |
| 6,484,531 B1 * | 11/2002 | Hambleton | F25D 23/10 312/286 |
| 10,238,210 B1 * | 3/2019 | Shoenfeld | A47B 96/00 |
| 11,346,150 B1 * | 5/2022 | Johnston | E06B 7/32 |
| 11,478,099 B1 * | 10/2022 | Bates | A47G 29/141 |

(Continued)

FOREIGN PATENT DOCUMENTS

| | | |
|---|---|---|
| FR | 3082410 A1 | 12/2019 |
| JP | 2000-296904 A | 10/2000 |

(Continued)

*Primary Examiner* — William L Miller
(74) *Attorney, Agent, or Firm* — Dinsmore & Shohl LLP

(57) ABSTRACT

A delivery management system configured to automatically order a delivery of an article based on an inventory status of the article in a storage room by using a computer is provided. The storage room is installed so that it penetrates an exterior wall of a house. The delivered article can be put into the storage room from the outside of the house, and the article put into the storage room can be taken out, in a living space of the house, from the storage room.

4 Claims, 8 Drawing Sheets

(56) References Cited

U.S. PATENT DOCUMENTS

| | | | | |
|---|---|---|---|---|
| 2001/0035703 | A1* | 11/2001 | Scholefield | F25D 23/10 |
| | | | | 312/242 |
| 2001/0045449 | A1* | 11/2001 | Shannon | G07C 9/21 |
| | | | | 232/19 |
| 2002/0035857 | A1* | 3/2002 | Stein | A47G 29/141 |
| | | | | 70/277 |
| 2002/0042665 | A1 | 4/2002 | Kakuta | |
| 2002/0180580 | A1* | 12/2002 | Gotfried | G07F 17/13 |
| | | | | 340/5.2 |
| 2005/0165612 | A1* | 7/2005 | Van Rysselberghe | G07C 9/33 |
| | | | | 705/332 |
| 2012/0158606 | A1* | 6/2012 | Moudy | G06Q 10/083 |
| | | | | 705/332 |
| 2015/0186840 | A1* | 7/2015 | Torres | A47F 10/02 |
| | | | | 705/339 |
| 2017/0213187 | A1* | 7/2017 | Choi | H04N 7/181 |
| 2017/0286905 | A1* | 10/2017 | Richardson | G06Q 10/0832 |
| 2018/0070753 | A1* | 3/2018 | Eveloff | H04W 4/025 |
| 2018/0228310 | A1* | 8/2018 | Enobakhare | A47G 29/20 |
| 2019/0043298 | A1* | 2/2019 | Moudy | B65D 81/18 |
| 2019/0122167 | A1* | 4/2019 | Bashkin | A62C 3/002 |
| 2019/0180544 | A1* | 6/2019 | Newcomb | E06B 7/32 |
| 2019/0231106 | A1* | 8/2019 | Kaiserman | F25D 23/10 |
| 2019/0248582 | A1* | 8/2019 | Nevison | A47G 29/20 |
| 2019/0254459 | A1* | 8/2019 | Hengst | A47G 29/141 |
| 2019/0261802 | A1* | 8/2019 | Vernal | A47G 29/20 |
| 2020/0327687 | A1* | 10/2020 | Kadowaki | G06T 7/55 |
| 2021/0005033 | A1* | 1/2021 | Roman | G06Q 10/0833 |
| 2021/0059456 | A1* | 3/2021 | Fontanilla | A47G 29/16 |
| 2021/0106160 | A1* | 4/2021 | Janas | A47G 29/30 |
| 2021/0293465 | A1* | 9/2021 | Cartwright | G06Q 10/0832 |
| 2021/0354294 | A1* | 11/2021 | Iwamoto | G06Q 50/28 |
| 2022/0031105 | A1* | 2/2022 | Newcomb | G06Q 10/0833 |
| 2022/0039581 | A1* | 2/2022 | Lee | A47G 29/30 |
| 2022/0058575 | A1* | 2/2022 | Moudy | H04L 67/125 |
| 2022/0125230 | A1* | 4/2022 | Jordan | A47G 29/141 |
| 2022/0151419 | A1* | 5/2022 | Lee | F25D 29/00 |
| 2022/0155005 | A1* | 5/2022 | Lee | H04L 9/3228 |
| 2022/0207590 | A1* | 6/2022 | Takagi | G06Q 30/0633 |
| 2022/0361699 | A1* | 11/2022 | Lee | G07C 9/00896 |
| 2022/0383241 | A1* | 12/2022 | Jung | G06K 7/10366 |
| 2022/0400886 | A1* | 12/2022 | Jordan | A47G 29/141 |
| 2023/0153747 | A1* | 5/2023 | Ruocco | G07C 9/00896 |
| | | | | 232/31 |
| 2023/0159286 | A1* | 5/2023 | Schler | E05F 15/77 |
| | | | | 414/389 |

FOREIGN PATENT DOCUMENTS

| | | |
|---|---|---|
| JP | 2002-117455 | 4/2002 |
| JP | 2016-045665 A | 4/2016 |
| JP | 2020-054775 A | 4/2020 |

* cited by examiner

DELIVERY MANAGEMENT SYSTEM AND DELIVERY MANAGEMENT METHOD

CROSS REFERENCE TO RELATED APPLICATIONS

This application is based upon and claims the benefit of priority from Japanese patent application No. 2020-168115, filed on Oct. 2, 2020, the disclosure of which is incorporated herein in its entirety by reference.

BACKGROUND

The present disclosure relates to a delivery management system and a delivery management method.

Japanese Unexamined Patent Application Publication No. 2016-45665 discloses a system for automatically delivering an article to a storage room partitioned into a plurality of storage spaces (e.g., storage lockers).

SUMMARY

In the delivery management system disclosed in Japanese Unexamined Patent Application Publication No. 2016-45665, it is necessary to go to the storage room installed (e.g., built) in a place different from a house (i.e., installed outdoors) in order to collect a delivered article, and to carry the collected article into the living space, so it is troublesome. Meanwhile, in order to receive a delivered article in the living space, it is necessary to wait for a deliverer (i.e., a person or the like who delivers the article) in the living space and receive the article directly from the deliverer, so it is inconvenient.

The present disclosure has been made in view of the above-described circumstances, and an object thereof is to provide a delivery management system and a delivery management method which make it possible to receive a delivered article in a living space without waiting for a deliverer thereof in the living space.

A first exemplary aspect is a delivery management system configured to automatically order a delivery of an article based on an inventory status of the article in a storage room by using a computer, in which the storage room is installed so that it penetrates an exterior wall of a house, and the delivered article can be put into the storage room from the outside of the house, and the article put into the storage room can be taken out, in a living space of the house, from the storage room.

Further, another exemplary aspect is a delivery management method for automatically ordering a delivery of an article based on an inventory status of the article in a storage room by using a computer, in which the storage room is installed so that it penetrates an exterior wall of a house, and the delivered article can be put into the storage room from the outside of the house, and the article put into the storage room can be taken out, in a living space of the house, from the storage room.

As described above, in an aspect of the present disclosure, the storage room is installed so that it penetrates the exterior wall of the house. Further, the delivered article can be put into the storage room from the outside of the house, and the article put into the storage room can be taken out, in the living space of the house, from the storage room. Therefore, it is possible to receive the delivered article in the living space without waiting for the deliverer thereof in the living space.

The storage room may be divided into a plurality of storage spaces. Further, each of the plurality of storage spaces may be configured so as to be able to be independently opened and closed. Further, the article can be put into the storage space from the outside of the house, and the article can be taken out, in the living space, from the storage space. By the above-described configuration, a storage space can be allocated for each type of articles.

Identification information may be attached to the delivered article. Further, when the article arrives at the storage room, the identification information may be read, and among the plurality of storage spaces, only a storage space associated with the read identification information may be opened. By the above-described configuration, it is possible to prevent an article from being delivered to a wrong destination.

Each of the plurality of storage spaces may include: an outer door through which the article is put into the storage space from the outside of the house; an inner door through which the article is taken out, in the living space, from the storage space; and a storage box configured to store the article. Further, when the article arrives at the storage room and the identification information is read, the outer door of the storage space associated with the identification information may be unlocked; the inner door thereof may be locked; and the storage box may be detached from the inner door and connected to the outer door. By the above-described configuration, it is possible to ensure the security of the house as well as preventing an article from being delivered to a wrong destination.

After the article is put into the storage space associated with the identification information and the locking of the outer door is detected, the outer door of the storage space associated with the identification information may be locked; the inner door thereof may be unlocked; and the storage box may be connected to the inner door and detached from the outer door. By the above-described configuration, the storage room can be used as a drawer(s) in the living space except when a delivered article is put into the storage room.

According to the present disclosure, it is possible to provide a delivery management system and a delivery management method which make it possible to receive a delivered article in a living space without waiting for a deliverer thereof in the living space.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
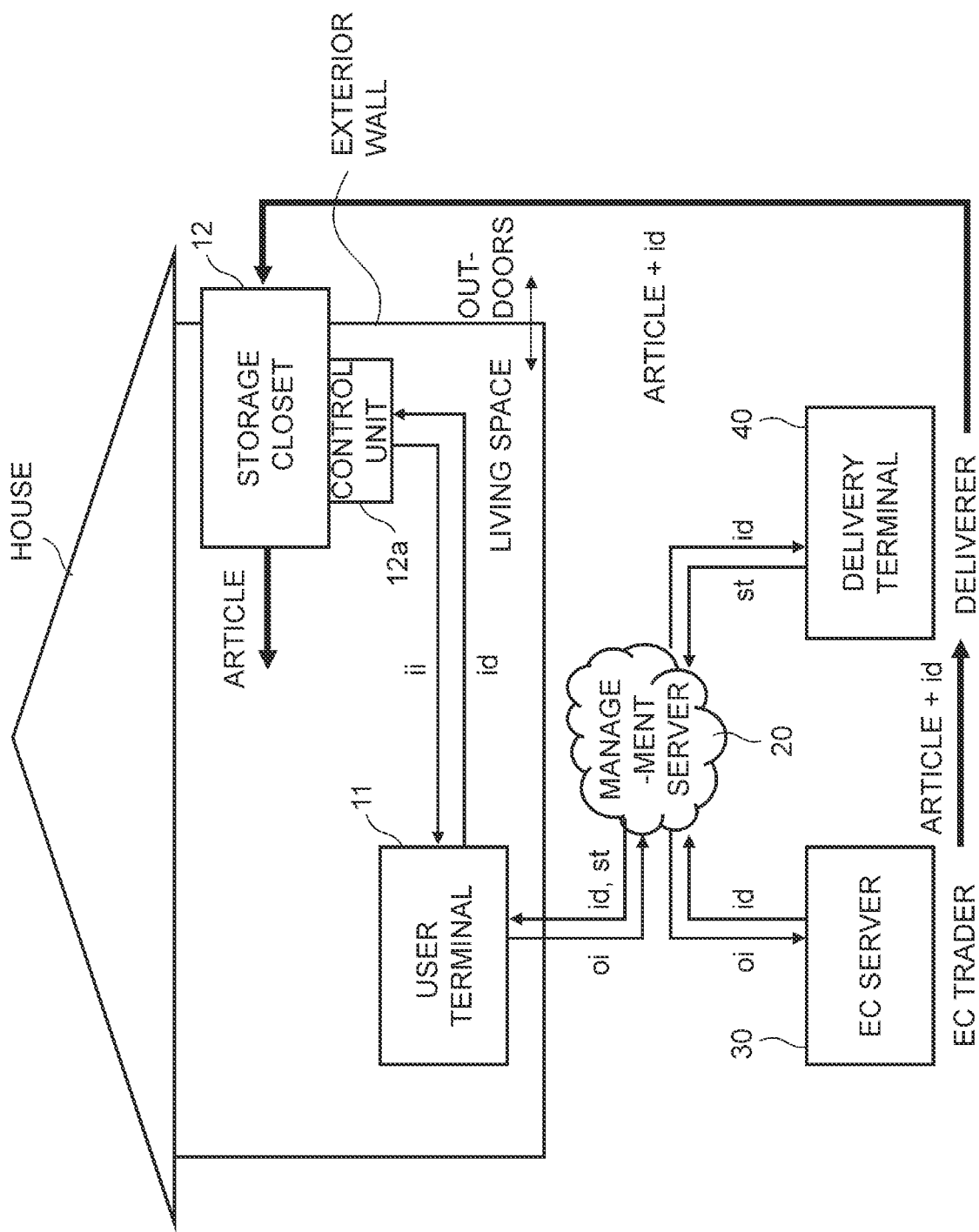
FIG. 1 is a block diagram of a delivery management system according to a first embodiment.

Specific embodiments will be described hereinafter in detail with reference to the drawings. The same or corresponding elements are denoted by the same reference numerals or symbols throughout the drawings, and redundant descriptions thereof are omitted as appropriate for clarifying the descriptions.

First Embodiment

Firstly, a delivery management system and a delivery management method according to a first embodiment will be described with reference to FIG. 1. FIG. 1 is a block diagram of the delivery management system according to the first embodiment. The delivery management system automatically orders a delivery of an article based on the inventory status of the article in the storage room by using a computer. As shown in FIG. 1, the delivery management system according to this embodiment includes a user terminal 11, a storage room 12, a management server 20, an EC (Electronic Commerce) server 30, and a delivery terminal 40. Note that the storage room 12 includes a control unit 12a that performs various types of control for the storage room 12.

Each of the user terminal 11, the control unit 12a, the management server 20, the EC server 30, and the delivery terminal 40 includes an arithmetic unit such as a CPU (Central Processing Unit), and a storage unit such as a RAM (Random Access Memory) and a ROM (Read Only Memory) in which various control programs, data, and the like are stored. That is, each of the user terminal 11, the control unit 12a, the management server 20, the EC server 30, and the delivery terminal 40 has a function as a computer, and they perform the below-described processes based on the aforementioned various control programs or the like.

As shown in FIG. 1, the user terminal 11 is a communication terminal that is connected to the management server 20 and the control unit 12a of the storage room 12 through a cable or wirelessly so that the user terminal 11 can communicate with them. The user terminal 11 is not limited to any particular terminal as long as it can communicate with the management server 20 and the control unit 12a. For example, the user terminal 11 may be a mobile communication terminal such as a smartphone or a tablet-type terminal, or a PC (Personal Computer) installed indoors.

Note that although the user terminal 11 is located in a living space in a house in FIG. 1, the user terminal 11 may be located outside the living space of the house, or outside the house. Further, in this specification, the meaning of the term "living space" includes an office space.

As shown in FIG. 1, the control unit 12a of the storage room 12 transmits inventory information ii to the user terminal 11 based on the inventory status of the article stored in the storage room 12. Then, the user terminal 11 generates order information oi based on the inventory information ii, and transmits the generated order information oi to the management server 20. The order information oi is information about an article to be delivered, and includes, for example, information about a commodity name, a quantity, a desired delivery date, a delivery destination (an address), etc. Further, as will be described later, in the case where the storage room 12 is divided into a plurality of storage spaces 120, the order information oi includes an identifier of a storage space 120 into which the article is put.

For example, when the amount (e.g., the number) of a certain article(s) decreases below a predetermined amount (e.g., a predetermined number) in the inventory information ii, the user terminal 11 orders a predetermined amount (e.g., a predetermined number) of the article(s). That is, in the delivery management system according to this embodiment, the delivery of an article(s) is automatically ordered based on the inventory status of the article(s) in the storage room 12.

Note that, in addition to the above-described automatic ordering, a user may order the delivery of an article(s) as desired by entering order information oi to the user terminal 11 by himself/herself.

The storage room 12 is installed (e.g., built) so that it penetrates an exterior wall of the house. Therefore, a delivered article can be put into the storage room 12 from the outside of the house, and the article put into the storage room 12 can be taken out, in the living space of the house, from the storage room 12.

The storage room 12 may also function as, for example, a refrigerator, a freezer, various types of shelves, a chest, a closet, a storage box, or the like.

Note that details of the storage room 12 will be described later.

The management server 20 is a server that manages the delivery management system. As shown in FIG. 1, the management server 20 is connected to the user terminal 11, the EC server 30, and the delivery terminal 40 so that the management server 20 can communicate with these apparatuses. The management server 20 is, for example, a cloud server. The management server 20 transmits order information oi received from the user terminal 11 to the EC server 30.

Further, the management server 20 also receives order identification information id issued by the EC server 30 and transmits the received order identification information id to the user terminal 11 and the delivery terminal 40. The order identification information id is information identifying the article to be delivered, and is, for example, an order number thereof. The order identification information id is also transmitted to the control unit 12a of the storage room 12 through the user terminal 11.

Further, the management server 20 receives status information st indicating the delivery status of the article from the delivery terminal 40 and transmits the received status information st to the user terminal 11. The status information st includes, for example, information such as "Waiting to be delivered", "In-delivering" or "Delivered" as the delivery status of the article.

The EC server 30 is, for example, a server constituting an EC site on the Internet managed by an EC trader. As shown in FIG. 1, the EC server 30, which is connected to the management server 20 so as to be able to communicate with the management server 20, issues order identification information id according to the order information oi received from the management server 20 and transmits the issued order identification information id to the management server 20.

The delivery terminal 40 is, for example, a terminal carried by a deliverer (i.e., a person or the like who delivers the article) and is a communication terminal capable of reading the order identification information id attached to the article. As shown in FIG. 1, the delivery terminal 40 is connected to the management server 20 so as to be able to communicate with the management server 20. The delivery terminal 40 receives the order identification information id from the management server 20 and transmits status information st indicating the delivery status of the article to the management server 20.

Note that the delivery terminal 40 may be a delivery robot, and this delivery robot may deliver the article on behalf of the deliverer.

The order identification information id is, for example, text (i.e., letters), a symbol, a bar code, a 2D (two-dimensional) code, a FRID (Radio Frequency IDentifier), or the like, and is directly or indirectly attached to the article. More specifically, the order identification information id is directly stuck on the article or embedded in the article. Alternatively, the order identification information id may be stuck on or embedded in the package of the article, and may be indirectly attached to the article. Note that the package is not limited to any particular packages, and may be, for example, a box, a bag, or a sheet made of paper or vinyl. The package may be a disposable type, or may be a reusable type such as a returnable box.

Note that, as shown in FIG. 1, the article with the order identification information id attached thereto is delivered from the EC trader to the storage room 12 by the deliverer. For example, the status information st, which indicates the delivery status of the article, is "Waiting to be delivered" in a period from when the delivery terminal 40 receives the order identification information id to when the deliverer receives the article from the EC trader. When the deliverer receives the article from the EC trader and reads the order identification information id attached to the article by using the delivery terminal 40, the status information st changes to "In-delivering". Further, when the deliverer puts the article into the storage room 12 and the order identification information id attached to the article is read again by the delivery terminal 40, the status information st changes to "Delivered".

Note that the status information st is not indispensable. On the other hand, the status information st may also be transmitted to the EC server 30.

Figure 2:
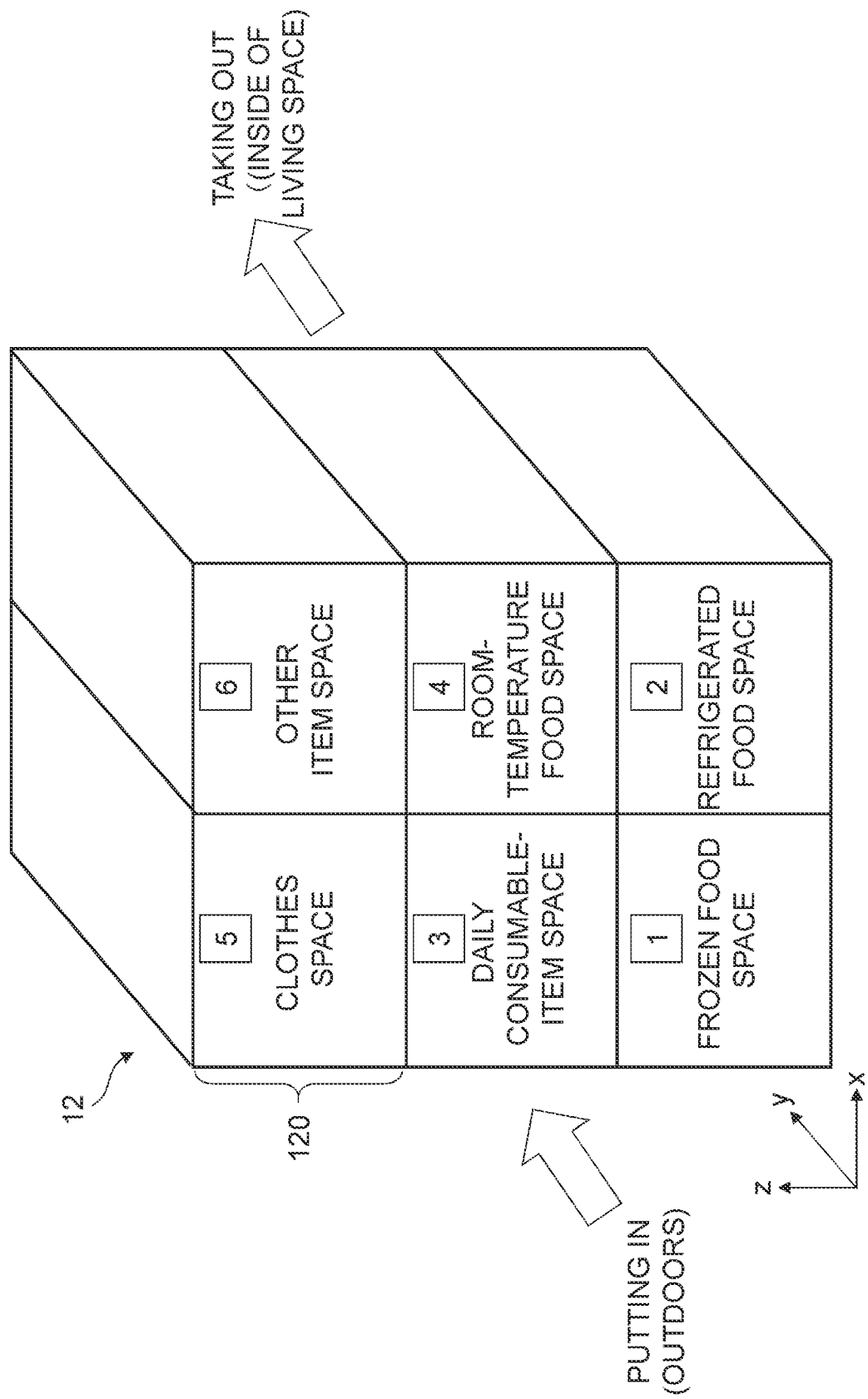
FIG. 2 is a schematic perspective view of a storage room 12.
Figure 3:
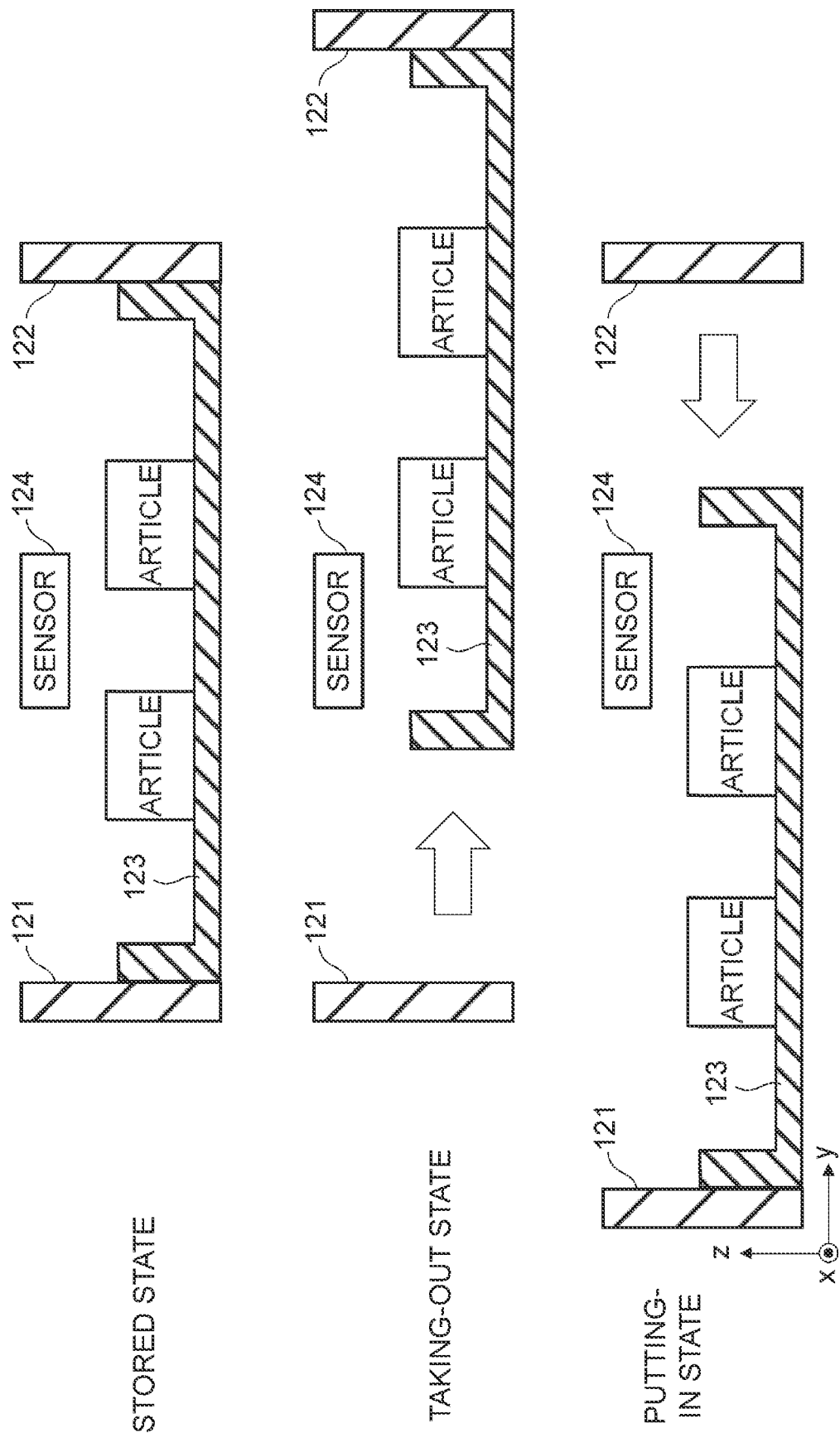
FIG. 3 is a schematic vertical cross-sectional view of a storage space 120.

An example of a structure of the storage room 12 will be described hereinafter with reference to FIGS. 2 and 3. FIG. 2 is a schematic perspective view of the storage room 12. FIG. 3 is a schematic vertical cross-sectional view of the storage space 120.

Note that, needless to say, right-handed xyz-orthogonal coordinate systems shown in FIGS. 2 and 3 are shown just for the sake of convenience to explain the positional relation among the components. As a general rule, the z-axis positive direction coincides with the vertically upward direction, and the xy-plane is in parallel to the horizontal plane. This applies throughout the drawings.

In the example shown in FIG. 2, the storage room 12 is divided into a plurality of storage spaces 120 by partition plates. In order to identify each of the storage spaces 120, for example, numbers 1 to 6 are assigned to the storage spaces 120, respectively, as their identifiers. For example, a storage space 120 to which an article is delivered is associated with order identification information id of that article by using the identifier of that storage space 120. In the example shown in FIG. 2, the storage room 12 is divided into six storage spaces 120 by two partition plates parallel to the xy-plane and one partition plate parallel to the yz-plane. Each of the storage spaces 120 can be independently opened and closed. Further, a delivered article can be put into a corresponding one of the storage spaces 120 from the outside of the house, and the article put into that storage space 120 can be taken out, in the living space of the house, from the storage space 120.

In the example shown in FIG. 2, each of the six storage spaces 120 is allocated to a respective one of a plurality of types of articles. Specifically, a storage space 120 having a number "1" is allocated as a "frozen food space"; a storage space 120 having a number "2" is allocated as a "refrigerated food space"; a storage space 120 having a number "3" is allocated as a "daily consumable-item space"; a storage space 120 having a number "4" is allocated as a "room-temperature food space"; a storage space 120 having a number "5" is allocated as a "clothes space"; and a storage space 120 having a number "6" is allocated as a "other item space".

Note that the number and the use of storage spaces 120 are not limited to any particular number and any particular use, and they are determined as desired. More specifically, the storage room 12 may be divided into a larger number of storage spaces 120.

The storage space 120 serving as the "frozen food space" may have a function as a freezer and may be used as a freezer.

The storage space 120 serving as the "refrigerated food space" may have a function as a refrigerator and may be used as a refrigerator.

Each of the storage spaces 120 serving as the "daily consumable-item space", the "room-temperature food space", the "clothes space", and the "other item space" may also be used as a storage space in the living space.

As described above, the storage room 12 may be used not only as a place where a delivered article is received, but also as a storage place in the living space. In such a case, it is possible to receive a delivered article without impairing the sense of daily life in the living space by the storage room 12. Further, it is possible to save a user or the like from having to convey an article delivered to the storage room 12 into a storage place.

A specific configuration of each of the storage spaces 120 will be described hereinafter.

As shown in FIG. 2, each of the storage spaces 120 is surrounded by upper and lower surfaces parallel to the xy-plane, and surfaces on both sides parallel to the yz-plane. Further, as shown in FIG. 3, each of the storage spaces 120 is equipped with an outer door 121 and an inner door 122, each of which can be independently locked, at respective ends (i.e., both ends) in the y-axis direction. The outer door 121 is a door through which an article is put into the storage space 120 from the outside. The inner door 122 is a door through which an article is taken out, in the living space, from the storage space 120. A storage box 123 for storing an article(s) is housed in each of the storage spaces 120.

Further, each of the storage spaces 120 is equipped with a sensor 124 that detects an inventory status (e.g., a storage status) in the storage box 123. The sensor 124 is, for example, but not limited to, a camera, an RFID (Radio-Frequency Identification) reader, or the like. In the case where the sensor 124 is a camera, the inventory status of an article can be recognized based on an image of the inside of the storage box 123 acquired by the sensor 124. In the case where the sensor 124 is an RFID reader, an RFID tag is attached to each article, and the inventory status of an article in the storage box 123 can be recognized by the sensor 124. The control unit 12a generates inventory information ii based on the inventory status detected by the sensor 124.

FIG. 3 shows positional relations among the outer door 121, the inner door 122, and the storage box 123 in a "Stored state", a "Taking-out state", and a "Putting-in state", which are shown in this order from the top of the drawing.

In the "Stored state" and the "Taking-out state", a drawer is formed by the inner door 122 and the storage box 123. That is, the outer door 121 is locked and the inner door 122 is unlocked. Further, the storage box 123 is connected to the inner door 122 and detached from the outer door 121.

In contrast, in the "Putting-in state", a drawer is temporarily formed by the outer door 121 and the storage box 123. That is, the inner door 122 is locked and the outer door 121 is unlocked. Further, the storage box 123 is detached from the inner door 122 and connected to the outer door 121.

The locking/unlocking operations of the outer and inner doors 121 and 122, and the connecting/detaching operations of the outer and inner doors 121 and 122 and the storage box 123 are controlled, for example, by the control unit 12a as described below.

The storage room 12 includes, for example, a reader (not shown) that reads order identification information id attached to a delivered article. When an article arrives at the storage room 12, the order identification information id attached thereto is read by the leader. The control unit 12a unlocks only the outer door 121 of a storage space 120 into which the article is to be put only when the order identification information id read by the reader matches (i.e., is the same as) order identification information id that has been acquired in advance. More specifically, the control unit 12a unlocks the outer door 121, locks the inner door 122, detaches the storage box 123 from the inner door 122, and connects the storage box 123 to the outer door 121.

In this way, the deliverer can pull and open the outer door 121 and put the article into the storage box 123 connected to the outer door 121.

Further, only when the order identification information id read by the reader matches the order identification information id acquired in advance, the outer door 121 of the storage space 120, into which the article is to be put, is unlocked. Therefore, it is possible to prevent the article from being delivered to a wrong destination. Further, since the inner door 122 is locked in this state, the security of the house can be ensured.

Next, after the article is put into the storage box 123, the deliverer presses and closes the outer door 121.

Note that the storage room 12 includes, for example, a sensor (not shown) that detects that the outer door 121 has been closed. When the sensor detects that the outer door 121 has been closed, the control unit 12a unlocks the inner door 122, locks the outer door 121, detaches the storage box 123 from the outer door 121, and connects the storage box 123 to the inner door 122. In this way, the storage room 12 can be used as a drawer(s) in the living space.

Note that the deliverer may deliver an article that has already been contained in a storage box 123. Specifically, the following are an example of a conceivable configuration.

When an article stored in the storage box 123 is removed (i.e., when the storage box 123 becomes empty (i.e., available), the control unit 12a orders the delivery of an article. The deliverer delivers an article which has already been contained in another storage box 123, and exchanges the empty storage box 123 in the storage room 12 with the other storage box 123 containing the article. The deliverer collects the empty storage box 123 and reuses the collected storage box 123 when an article is ordered the next time.

As described above, in the delivery management system according to this embodiment, the storage room 12 is installed (e.g., built) so that it penetrates the exterior wall of the house. Therefore, a delivered article can be put into the storage room 12 from the outside of the house, and the article put into the storage room 12 can be taken out, in the living space, from the storage room 12. Therefore, it is possible to receive a delivered article in a living space without waiting for a deliverer thereof in the living space.

Second Embodiment

Figure 4:
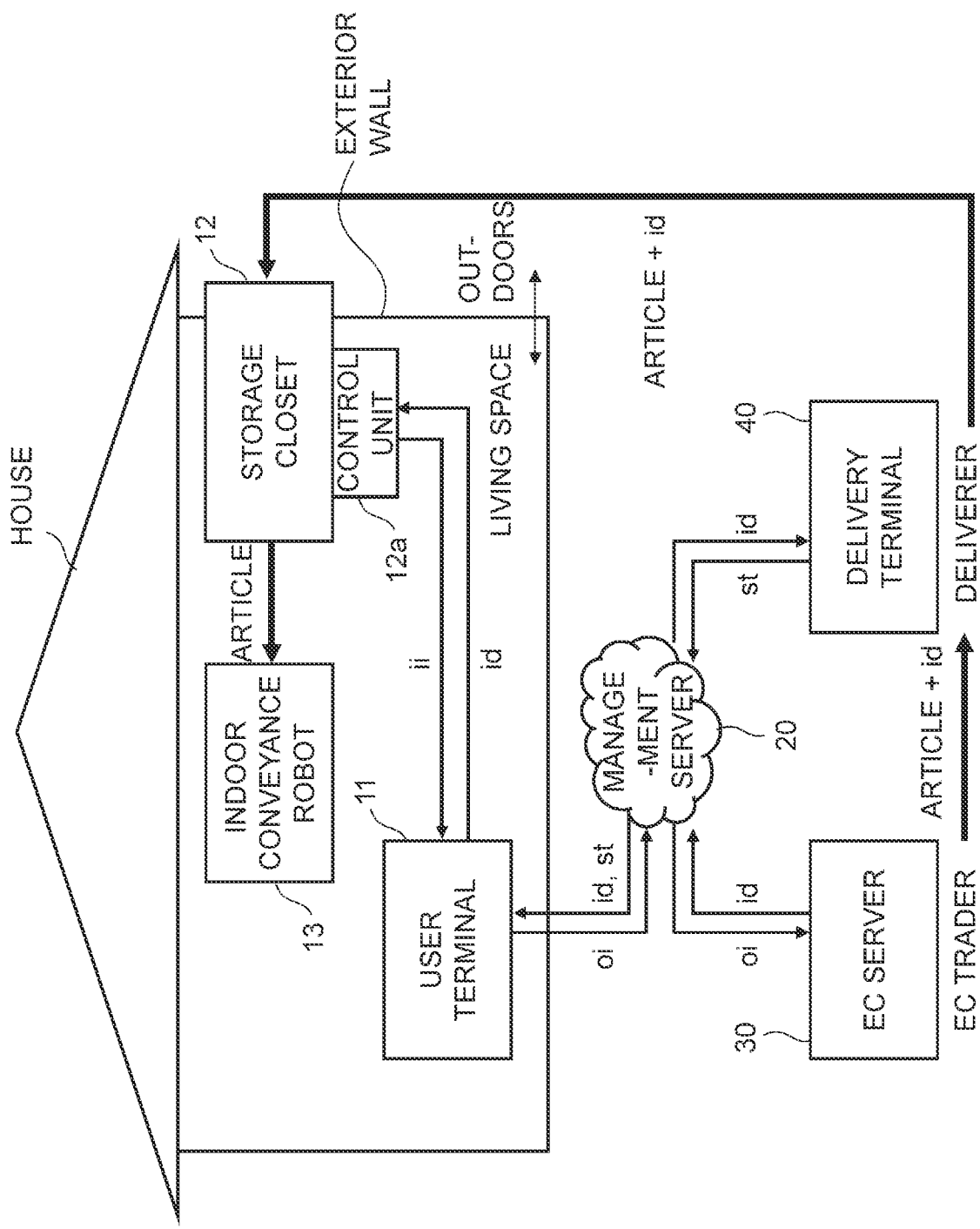
FIG. 4 is a block diagram of a delivery management system according to a second embodiment.

Next, a delivery management system and a delivery management method according to a second embodiment will be described with reference to FIG. 4. FIG. 4 is a block diagram of a delivery management system according to the second embodiment.

As shown in FIG. 4, a delivery management system according to this embodiment includes an indoor conveyance robot 13 in addition to the user terminal 11, the storage room 12, the management server 20, the EC server 30, and the delivery terminal 40 shown in FIG. 1. The indoor conveyance robot 13 also includes, for example, an arithmetic unit and a storage unit in which various control programs, data, and the like are stored, has functions as a computer, and performs the below-described processes based on the various control programs.

The indoor conveyance robot 13 can move in the living space and includes, for example, an arm(s) for grasping a delivered article. As shown in FIG. 1, for example, the indoor conveyance robot 13 takes out an article from the storage room 12 and conveys the article to a destination (e.g., to a user).

In the delivery management system according to this embodiment, as compared to the delivery management system according to the first embodiment, it is possible, by using the indoor conveyance robot 13, to save a user or the like from having to take out an article from the storage room 12.

The rest of the configuration is similar to that of the first embodiment, and therefore the description thereof is omitted.

Modified Example of Second Embodiment

Figure 5:
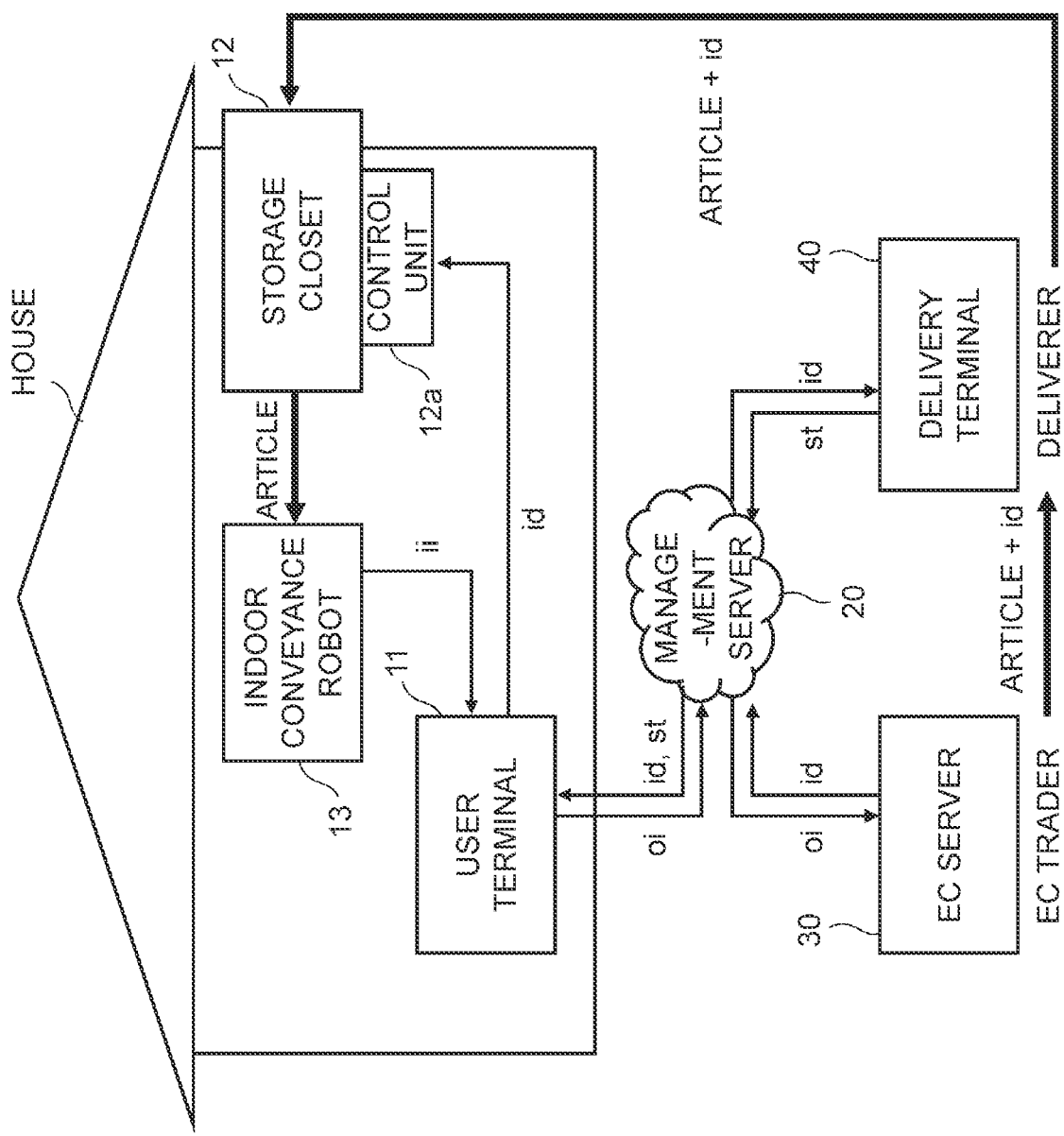
FIG. 5 is a block diagram of a delivery management system according to a modified example of the second embodiment.

Next, a delivery management system and a delivery management method according to a modified example of the second embodiment will be described with reference to FIG. 5. FIG. 5 is a block diagram of a delivery management system according to a modified example of the second embodiment.

In FIG. 5, the storage room 12 does not include the sensor 124, and the indoor conveyance robot 13 instead includes a sensor (not shown) similar to the sensor 124. Further, for example, when the indoor conveyance robot 13 takes out an article from the storage space 120, it generates inventory information ii based on an inventory status detected by the sensor. Then, the indoor conveyance robot 13, instead of the control unit 12a of the storage room 12, transmits the generated inventory information ii to the user terminal 11.

As described above, the indoor conveyance robot 13 may detect an inventory status and generate inventory information ii when, for example, it takes out an article from the storage space 120.

The rest of the configuration is similar to that of the second embodiment shown in FIG. 4, and therefore the description thereof is omitted.

Third Embodiment

Figure 6:
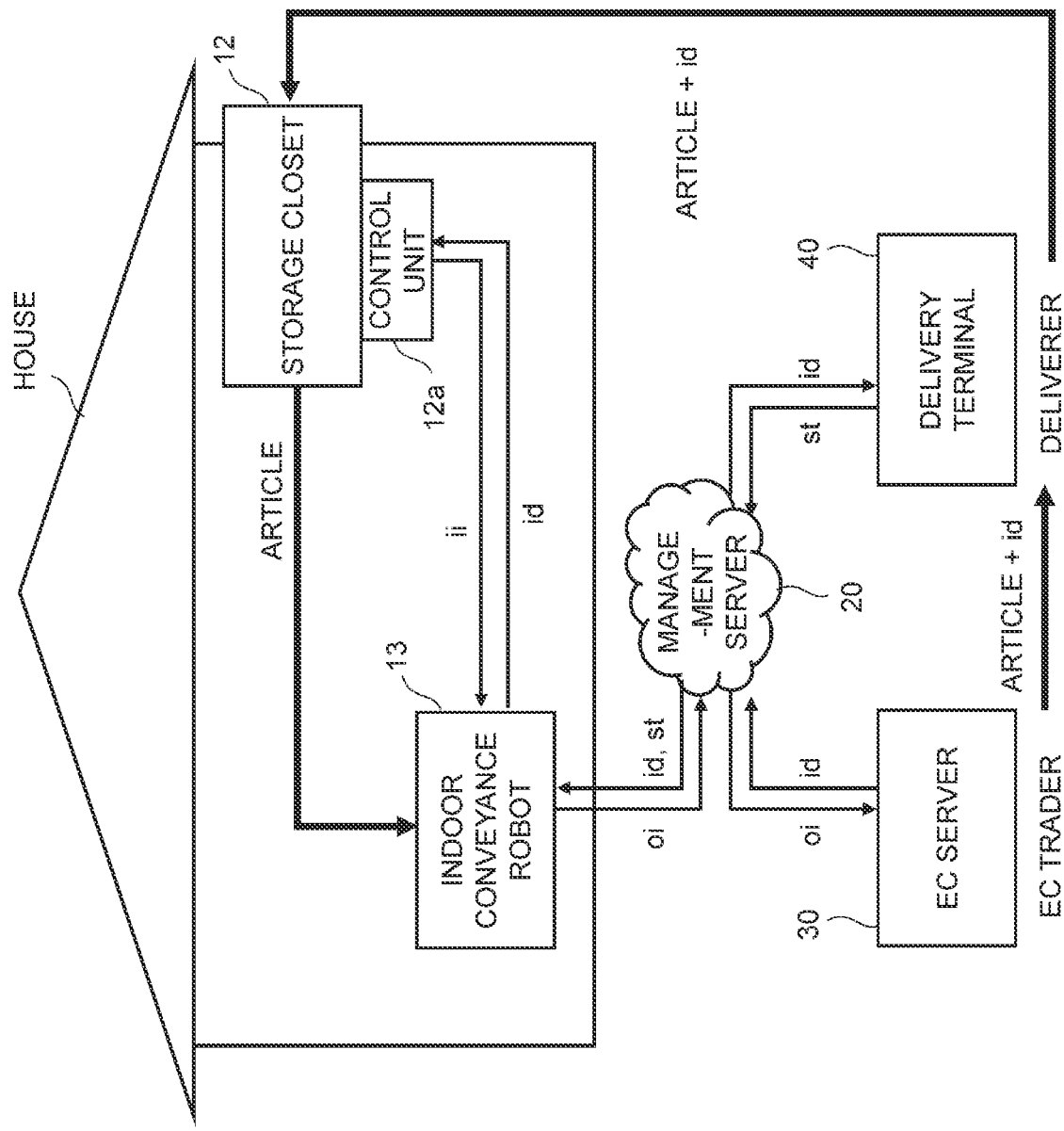
FIG. 6 is a block diagram of a delivery management system according to a third embodiment.

Next, a delivery management system and a delivery management method according to a third embodiment will be described with reference to FIG. 6. FIG. 6 is a block diagram of a delivery management system according to the third embodiment.

As shown in FIG. 6, in the delivery management system according to this embodiment, the indoor conveyance robot 13 also functions as the user terminal 11 shown in FIG. 4.

As shown in FIG. 6, the control unit 12a of the storage room 12 transmits inventory information ii to the indoor conveyance robot 13 based on the inventory status of an article in the storage room 12. Then, the indoor conveyance robot 13 generates order information oi based on the inventory information ii and transmits the generated order information oi to the management server 20.

As shown in FIG. 6, the management server 20 receives order identification information id issued by the EC server 30, and transmits the received order identification information id to the indoor conveyance robot 13 and the delivery terminal 40. Further, the management server 20 receives status information st indicating the delivery status of an article from the delivery terminal 40 and transmits the received status information st to the indoor conveyance robot 13.

As described above, in the delivery management system according to this embodiment, the indoor conveyance robot 13 also functions as the user terminal 11 according to the second embodiment shown in FIG. 4. Therefore, the delivery management system according to this embodiment can have a simpler configuration than that of the delivery management system according to the second embodiment.

The rest of the configuration is similar to that of the second embodiment, and therefore the description thereof is omitted.

Other Embodiment

Figure 7:
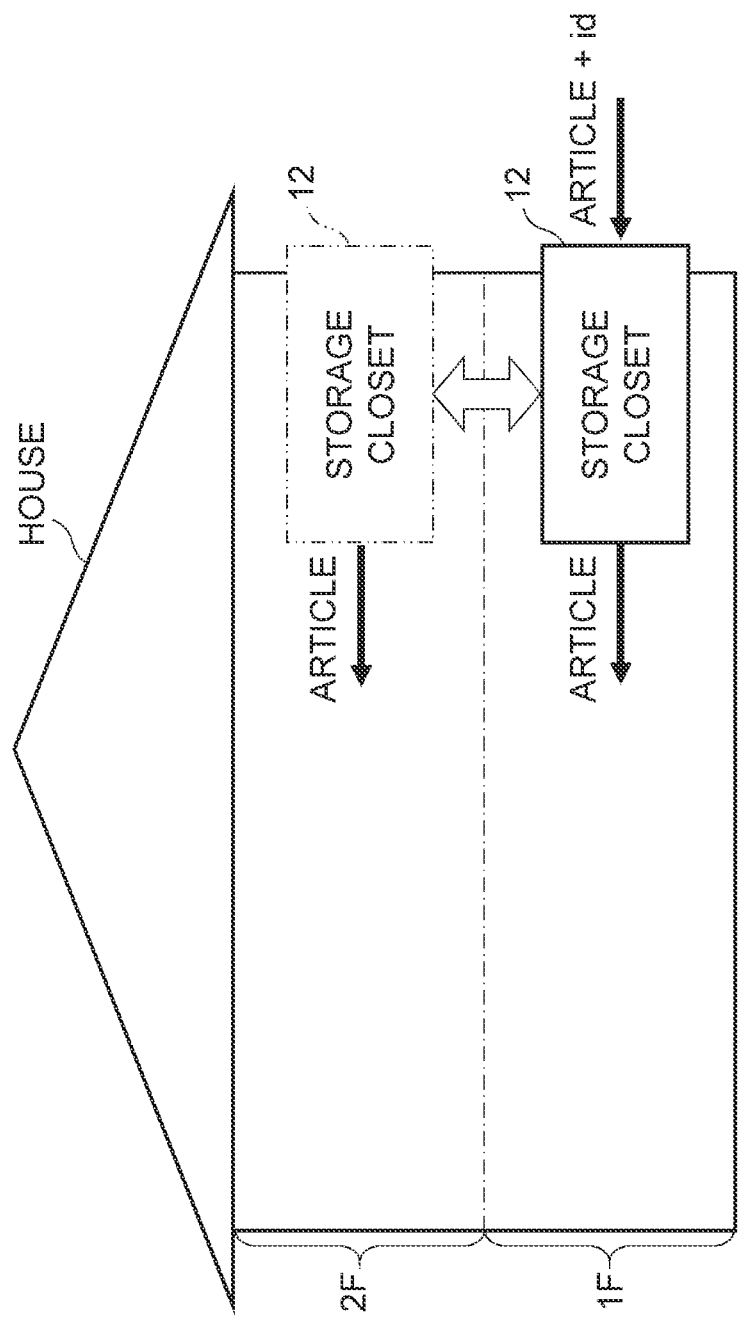
FIG. 7 is a schematic diagram showing a configuration of a storage room 12 according to another embodiment.
Figure 8:
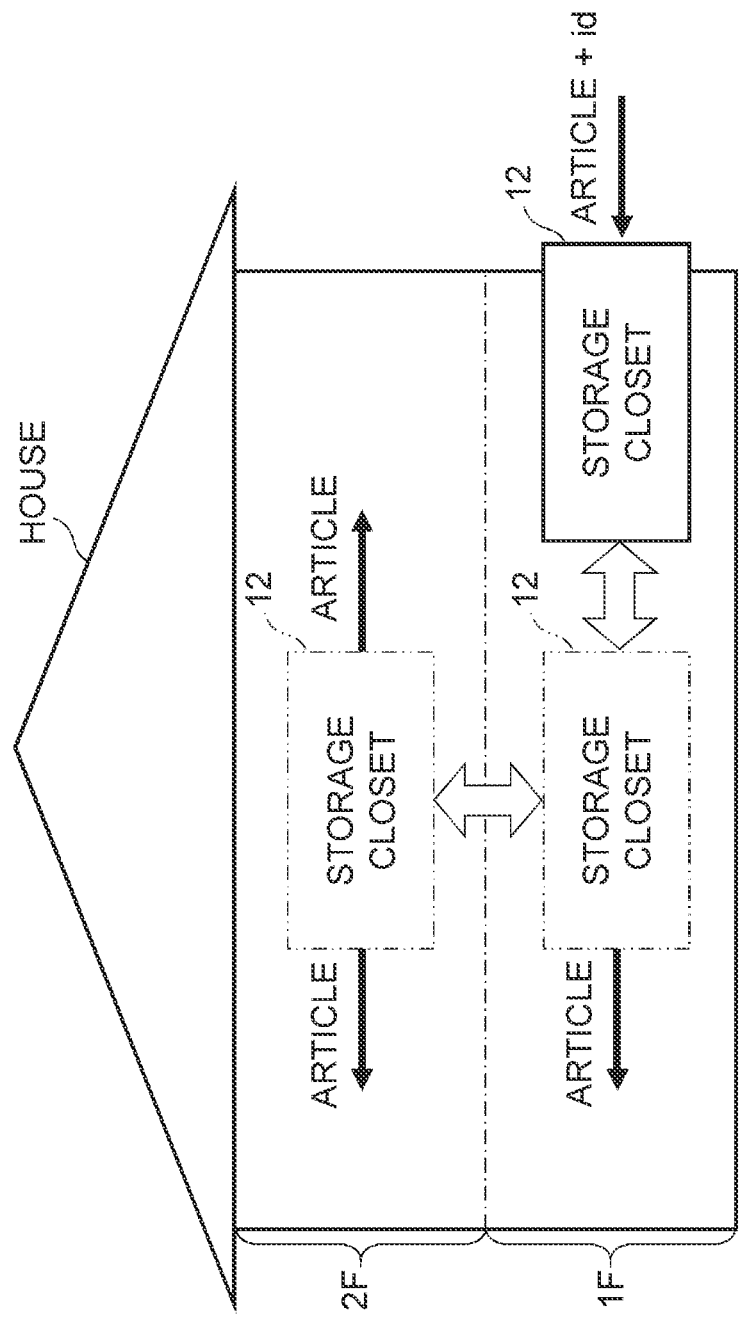
FIG. 8 is a schematic diagram showing a configuration of a storage room 12 according to still another embodiment.

Next, delivery management systems and delivery management methods according to other embodiments will be described with reference to FIGS. 7 and 8. FIGS. 7 and 8 are schematic diagrams showing configurations of storage rooms 12 according to the other embodiments.

As shown in FIGS. 7 and 8, the storage room 12 may be able to move in the vertical direction. In FIGS. 7 and 8, the storage room 12 functions as an elevator capable of moving upward and downward between a first floor (1F) and a second floor (2F). Therefore, it is possible to take out, on the second floor, an article that was put into the storage room 12 on the first floor from the storage room 12.

Note that the storage room 12 may be configured so as to be able to move upward to a third floor or a higher floor, and/or to move downward to a basement floor.

The type of the elevator is not limited to any particular types. Typical examples of the elevator include a wire-rope-type elevator and a hydraulic-type elevator. Alternatively, the elevator may be a type of an elevator that slides along a vertical pole.

Further, in the example shown in FIG. 7, since the storage room 12 moves only in the vertical direction, an article is put into the storage room 12 from one of the ends thereof and the article put into the storage room 12 is taken out from the other end of the storage room 12.

In contrast, in the example shown in FIG. 8, the storage room 12 can move in the horizontal direction as well as in the vertical direction. Specifically, the storage room 12, which is installed (e.g., built) so that it penetrates the exterior wall, can be moved into the living space. Therefore, an article that was put into the storage room 12, which penetrates the exterior wall, from one of the ends thereof can be taken out from either end (or at least one of both ends) of the storage room 12 which has moved into the living space.

In the above-described examples, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A delivery management system configured to automatically order a delivery of an article based on an inventory status of the article in a storage room by using a computer, wherein the storage room is installed so that it penetrates an exterior wall of a house, the delivered article can be put into the storage room from the outside of the house, and the article put into the storage room can be taken out, in a living space of the house, from the storage room, the storage room is divided into a plurality of storage spaces, and each of the plurality of storage spaces is configured so as to be able to be independently opened and closed; the article can be put into the storage space from the outside of the house; and the article can be taken out, in the living space, from the storage space, identification information is attached to the delivered article, when the article arrives at the storage room, the identification information is read, and among the plurality of storage spaces, only a storage space associated with the read identification information is opened, each of the plurality of storage spaces includes:
  an outer door through which the article is put into the storage space from the outside of the house;
  an inner door through which the article is taken out, in the living space, from the storage space; and
  a storage box configured to store the article, and when the article arrives at the storage room and the identification information is read, the outer door of the storage space associated with the identification information is unlocked; the inner door thereof is locked; and the storage box is detached from the inner door and connected to the outer door.

2. The delivery management system according to claim 1, wherein after the article is put into the storage space associated with the identification information and the locking of the outer door is detected, the outer door of the storage space associated with the identification information is locked; the inner door thereof is unlocked; and the storage box is connected to the inner door and detached from the outer door.

3. A delivery management method for automatically ordering a delivery of an article based on an inventory status of the article in a storage room by using a computer, wherein
the storage room is installed so that it penetrates an exterior wall of a house,
the delivered article can be put into the storage room from the outside of the house, and the article put into the storage room can be taken out, in a living space of the house, from the storage room,
the storage room is divided into a plurality of storage spaces,
each of the plurality of storage spaces is configured so as to be able to be independently opened and closed; the article can be put into the storage space from the outside of the house; and the article can be taken out, in the living space, from the storage space,
identification information is attached to the delivered article,
when the article arrives at the storage room, the identification information is read, and among the plurality of storage spaces, only a storage space associated with the read identification information is opened,
each of the plurality of storage spaces includes:
an outer door through which the article is put into the storage space from the outside of the house;
an inner door through which the article is taken out, in the living space, from the storage space; and
a storage box configured to store the article, and
when the article arrives at the storage room and the identification information is read, the outer door of the storage space associated with the identification information is unlocked; the inner door thereof is locked; and the storage box is detached from the inner door and connected to the outer door.

4. The delivery management method according to claim 3, wherein
after the article is put into the storage space associated with the identification information and the locking of the outer door is detected, the outer door of the storage space associated with the identification information is locked; the inner door thereof is unlocked; and the storage box is connected to the inner door and detached from the outer door.

* * * * *